INVENTOR:
Ronald Bowman

ATTORNEYS

INVENTOR:
Ronald Bowman

ATTORNEYS

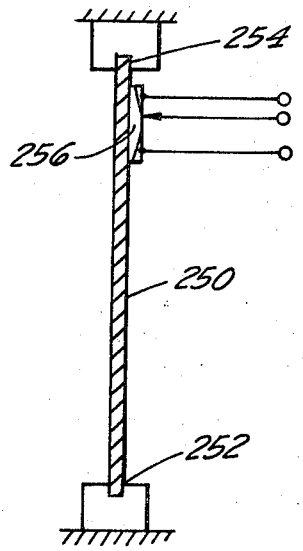
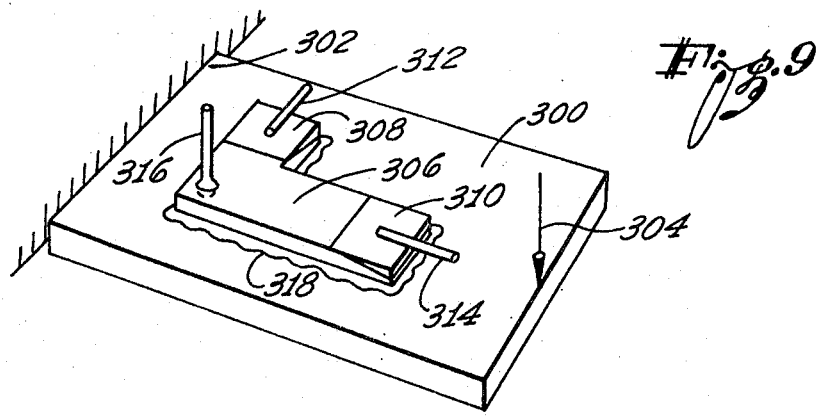

United States Patent Office 3,446,064
Patented May 27, 1969

3,446,064
STRESS SENSOR
Ronald Bowman, Tujunga, Calif., assignor, by mesne assignments, to Whittaker Corporation, Los Angeles, Calif.
Filed Dec. 19, 1966, Ser. No. 602,872
Int. Cl. G01n 7/22
U.S. Cl. 73—88.5                                6 Claims

ABSTRACT OF THE DISCLOSURE

The present invention relates to means for detecting stress. In particular, the present invention relates to a device which may be used to provide for a detection of stress after the stress is above a predetermined threshold level by producing a switching characteristic. Also, the present invention relates to the use of such a threshold stress detection device as part of an oscillator circuit to provide a frequency modulated output signal having a frequency in accordance with the stress. Basically the stress sensitive device of the present invention operates as a switching device which provides for the switching characteristic after the stress is above a threshold level.

---

Many prior art devices have been used to provide for switching in accordance with the level of an external force such as pressure, vibration, acceleration etc. For example, an electromechanical switch may be operated by using the external force to produce a mechanical motion which then provides for a closure of the electrical contacts. The closure of the electrical contacts may be facilitated by the use of a snap action mechanism. Another way to provide the switching is to use an input sensor such as a pressure transducer, an accelerometer, a vibrometer, etc. in combination with an electronic bistable circuit which switches from a first state to a second state when a predetermined output level is generated by the sensor.

The prior art methods of providing for a threshold detection have several disadvantages. For example, it is difficult to set and maintain the point of switching for the electromechanical type of switches. Also, vibration and shock may cause contact chatter with the electromechanical switches. The electronic switches do eliminate many of the above mentioned difficulties found with the electromechanical type switches, but the existing electronic switches are relatively complex and expensive. In addition, the complexity of the electronic switches provides for a reduced reliability.

The present invention is directed to the use of a unijunction transistor to operate as a threshold detector. Unijunction transistors have been used in the past as part of threshold detectors, but only in combination with an input sensor such as a pressure transducer, an accelerometer, a vibrometer, etc. The input sensor detects the level of the external force to provide for an output voltage having a value in accordance with the level of the external force. The output voltage is then applied to the unijunction transistor. The unijunction transistor provides for a switching characteristic when the output voltage is above a predetermined level.

The present invention eliminates the need for the separate input sensor and provides for a direct detection of the external force by the unijunction transistor. The present invention, therefore, provides for a unijunction transistor which is sensitive to stress so as to provide for a switching characteristic in accordance with the stress. It is to be appreciated that the stress sensitive nature of the unijunction transistor of the present invention may be used in combination with other types of transducer structures so as to provide for a detection of pressure, acceleration, vibration, etc.

It is known to provide a strain gauge from semiconductor material. The semi-conductor is attached to a physical member and the physical member is stressed. The stress applied to the physical member is transmitted to the semi-conductor material and the semi-conductor material exhibits a piezo-resistive effect. That is, the semi-conductor material has a variable resistance in accordance with the stress. The semi-conductor material is used as a strain gauge by providing ohmic contacts at opposite ends of the semi-conductor material. The semi-conductor material may now be incorporated as a measurement circuit so as to provide an output signal having a value in accordance with the resistance of the semi-conductor material.

The present invention is directed to use of a unijunction transistor as the stress sensitive element. An ordinary unijunction transistor is constructed of a piece of semi-conductor material having a pair of base terminals at opposite ends of the semi-conductor material. A single rectifying contact called the emitter junction is provided at a point between the base terminals. The rectifying contact or emitter junction operates as a diode. The unijunction transistor is usually operated with a first voltage applied between the base terminals and a second voltage applied at the terminal connected to the emitter junction. When the voltage at the emitter terminal is above a particular level, which is determined by the internal resistance of the unijunction transistor, the unijunction transistor provides for a switching characteristic by having a forward emitter current flow between the emitter terminal and one of the base terminals while the voltage is lowered. The resistance appears to be lowered between the emitter terminal and the one of the base terminals and the change of resistance is called a negative resistance characteristic since the voltage decreases as the current increases.

The present invention incorporates a unijunction transistor as stress sensitive member by attaching at least a portion of the unijunction transistor to a physical member and by applying stress to the physical member. The unijunction transistor may be attached by methods similar to those used for the bonding of the semi-conductor strain gauges. The stresses applied to the physical member are transmitted to the unijunction transistor to provide for a change in the internal resistance of the unijunction transistor. The change in resistance of the unijunction transistor therefore provides for a change in the value of the voltage which need be applied to the emitter terminal to produce the switching characteristic. The unijunction transistor of the present invention may be operated as a stress threshold detecting device since the voltage applied to the emitter terminal may be maintained at a constant level and the applied stress may be varied to a level to produce the switching characteristic. The unijunction transistor of the present invention may also be used by varying the value of the voltage applied to the emitter terminal and the particular voltage value would depend upon the stress applied to the unijunction transistor. For example, the unijunction transistor may be incorporated in an oscillating structure such as a relaxation oscillator and the unijunction transistor would be switched on and off at a particular voltage level in accordance with the stress applied to the unijunction transistor. The frequency output from the relaxation oscillator would then be in accordance with the stress applied to the unijunction transistor.

It is also possible to provide for an increase in the internal resistance in a first portion of the unijunction transistor while a second portion of the unijunction transistor undergoes a decrease in internal resistance. This opposite change of resistance may be used to magnify the effect of the stress applied to the physical member which is transmitted to the unijunction transistor so that the unijunction transistor is more sensitive to changes in stress.

A clearer understanding of the invention will be had with reference to the following description and drawings, wherein:

FIGURE 1 symbolically illustrates a unijunction transistor;

FIGURE 8 is an illustration of a unijunction transistor according to the present invention attached to a diaphragm member; and FIGURE 9 is an illustration of an embodiment of the unijunction transistor of the present invention formed to provide for opposite changes of resistance in different portions of the unijunction transistor.

Figure 1:
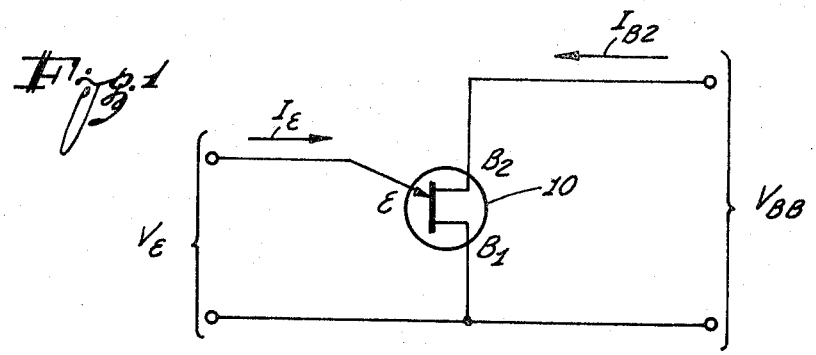

In FIGURE 1 a unijunction transistor 10 is symbolically illustrated. The unijunction transistor 10 of FIGURE 1 includes a pair of base terminals $B_1$ and $B_2$ and an emitter terminal E intermediate the pair of base terminals. In ordinary use, the unijunction transistor 10 has a voltage $V_{BB}$ applied between the base terminals and a current $I_{B2}$ flows between the base terminals in accordance with the internal resistance between the base terminals. In addition a voltage $V_E$ is applied to the emitter terminal and the current $I_E$ defines any current which flows through the unijunction transistor from the emitter terminal E.

Figure 2:
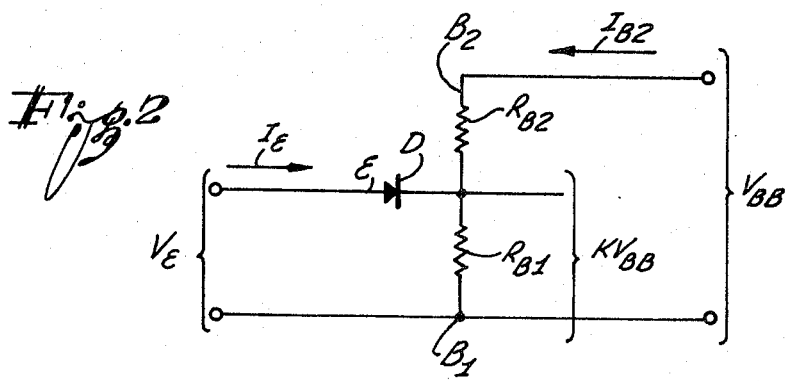
FIGURE 2 is a simplified equivalent circuit of the unijunction transistor of FIGURE 1.

In FIGURE 2 a simplified equivalent circuit of the unijunction transistor of FIGURE 1 is shown and in FIGURE 2 the internal resistance of the unijunction transistor is represented by two separate resistors $R_{B1}$ and $R_{B2}$. The junction between the resistors $R_{B1}$ and $R_{B2}$ is the internal junction point provided by the emitter junction. The emitter junction is symbolized by a diode D between the emitter terminal E and the junction point between the resistors $R_{B1}$ and $R_{B2}$. In a normal circuit operation the $_{B1}$ terminal is connected to a reference potential such as ground either directly or through an external resistor. When there is no forward emitter current $I_E$ flowing the unijunction transistor acts as a single voltage divider and a particular fraction K of the voltage $V_{BB}$ appears at the junction between the resistors $R_{B1}$ and $R_{B2}$. When the emitter voltage $V_E$ is less than $KV_{BB}$ the emitter junction is reverse biased and only a small emitter leakage current flows. When the voltage $V_E$ is greater than $KV_{BB}$ the emitter junction is forward biased and a forward emitter current flows between the emitter terminal E and the $B_1$ terminal. As the forward emitter current $I_2$ increases the emitter voltage $V_E$ decreases and a negative resistance characteristic is obtained.

Figure 3:
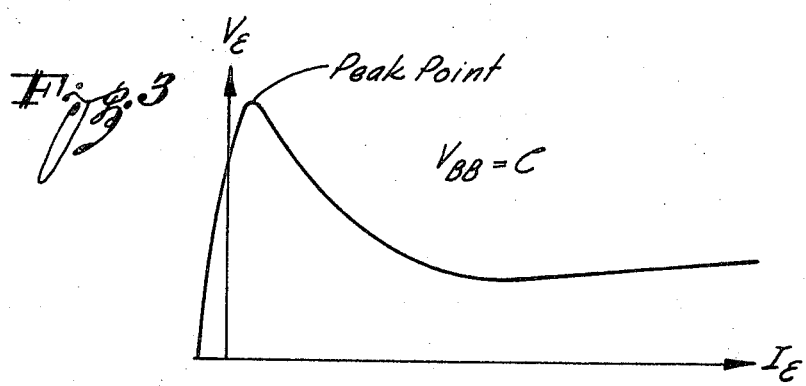
FIGURE 3 is a curve illustrating certain operating parameters of the unijunction transistor of FIGURE 1.

The negative resistance characteristic may be seen in FIGURE 3 where the voltage $V_E$ is plotted against the current $I_E$. When the voltage $V_E$ is below a particular value a small leakage current flows which is opposite in direction to the forward current. As the voltage $V_E$ increases the leakage current slowly decreases until the value of the voltage $V_E$ is sufficiently high to provide a small forward current. Further in change of the voltage $V_E$ provide for increases in the forward current $I_2$. At a particular value for the voltage $V_E$, designated as the peak point, the diode D shown in FIGURE 2 becomes forward biased and the emitter current $I_E$ experiences a rapid increase while the voltage $V_E$ decreases. This decrease in voltage while the current increases is the negative resistance region of the unijunction transistor and since the negative resistance region has a sharp slope the negative resistance region is the switching position of the unijunction transistor. After the negative resistance region the unijunction transistor experience saturation where the resistance is positive and an increase of the voltage $V_E$ produces an increase of the current $I_E$.

The above-described characteristic of the unijunction transistor is useful in providing for switching functions. The emitter terminal of the unijunction transistor may be coupled to the voltage output of an input sensor so as to provide for a threshold detection. The particular value of the voltage output from the input sensor which is necessary to switch the unijunction transistor depends on the value of the voltage $V_{BB}$ and the value of the internal resistor $R_{B1}$ and $R_{B2}$ in addition to any external resistors.

Figure 4:
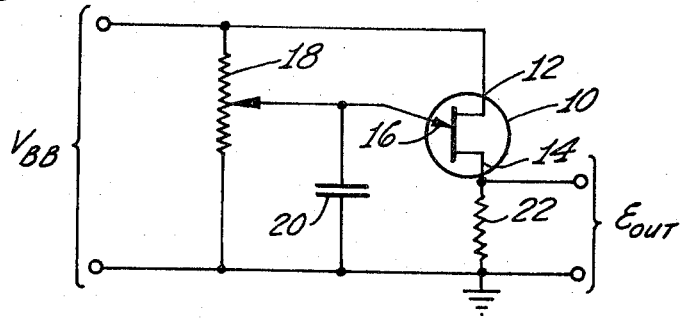
FIGURE 4 illustrates the unijunction transistor of FIGURE 1 connected in a simple relaxation oscillator circuit.

Another common use of a unijunction transistor is in a relaxation oscillator circuit as shown in FIGURE 4. In FIGURE 4 the unijunction transistor 10 includes a pair of base terminals 12 and 14 and an emitter terminal 16. The voltage $V_{BB}$ is applied to the base terminal 12. In addition a potentiometer 18 is also connected between the voltage $V_{BB}$ and a reference potential such as ground. The arm of the potentiometer 18 is connected to the emitter terminal 16 and a capacitor 20 is also connected between the emitter terminal 16 and the reference potential such as ground. Finally a load resistor 22 is connected between the base terminal 14 and the reference potential such as ground.

In the initial operating condition of the oscillator circuit of FIGURE 4 the capacitor 20 is discharged. When the voltage $V_{BB}$ is connected a voltage appears at the arm of the potentiometer 18 which starts to charge up the capacitor 20. As the capacitor 20 charges the voltage at the emitter terminal 16 increases and eventually the voltage at the emitter terminal 16 reaches a value necessary to provide for a forward biasing of the diode portion of the unijunction transistor 10. When the diode portion of the unijunction transistor 10 is forward biased the capacitor 20 is discharged through the unijunction transistor and the load resistor 22 to the reference potential such as ground. The discharge of the capacitor 20 produces a voltage pulse across the load resistor 22 which is used as an output signal.

After the capacitor 20 is discharged, the sequence starts again due to the voltage appearing at the arm of the potentiometer 18. The output signal across the load resistor 22 is therefore a series of pulses having a frequency in accordance with the voltage $V_{BB}$, the position of the arm of the potentiometer 18, the value of the capacitor 20 and other parameters of the circuit. In addition the frequency of the output signal is dependent upon internal resistances of the unijunction transistor and in particular the ratio of the resistance between the emitter and the base 12 and the emitter 16 of the base 14. Changes in the resistances between the emitter 16 and the bases 12 and 14 may provide for a change in the frequency of the output signal since changes in the resistances provide for a change in the voltage necessary to forward bias the unijunction transistor. Since changes in the internal resistance of the unijunction transistor may be used to control the switching point of the unijunction transistor which in turn controls the frequency of the output signal, the unijunction transistor may be used as the control element in the circuit of FIGURE 4 if the resistance of the unijunction transistor may be made responsive to an external force.

Figure 5:
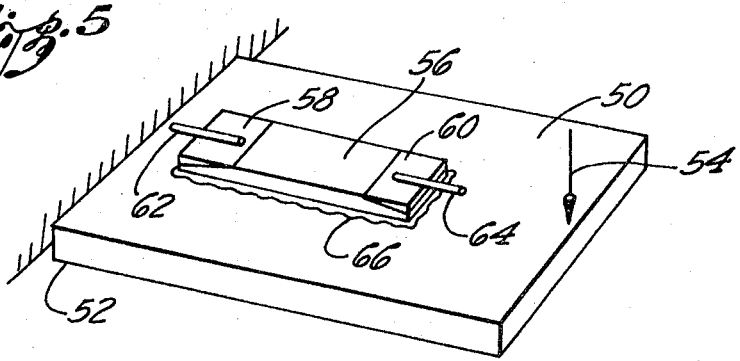
FIGURE 5 is an illustration of a semi-conductor strain gauge attached to a physical member.

FIGURE 5 illustrates an ordinary semi-conductor strain gauge. In FIGURE 5 a physical member 50 is rigidly attached at one end 52 and has a force 54 applied at the other end. The physical member 50 as shown in FIGURE 5 operates as a cantilever beam and the force 54 applies stress throughout the physical member 50. The semi-conductor strain gauge includes a piece of semi-conductor material 56. A pair of ohmic regions 58 and 60 are attached to each end of the semi-conductor material 56. A pair of lead members 62 and 64 are attached for example by soldering to the ohmic regions 58 and 60.

The semi-conductor strain gauge of FIGURE 5 may be attached to the physical member 50 by any desirable bonding method. One common method of bonding semi-conductor strain gauges is through the use of cement such as cement 66 which is applied around the edge of the semi-conductor member. The cement may also cover the bottom surface of the semi-conductor material. In addition, the semi-conductor member may be prebonded or attached to a base member (not shown) and the base member may be attached to the physical member 50. In each instance the important feature is in having the semi-conductor member 56 responsive to the stress applied to the physical member 50.

The resistance of the semi-conductor member 56 varies in accordance with the stress and changes in the stress applied to the semi-conductor member 56 result in changes in resistance of the semi-conductor material. The output leads 62 and 64 may be connected in a measurement circuit such as a Wheatstone bridge so as to provide for a measurement of the change in resistance of the semi-conductor material. The semi-conductor strain gauge therefore may be used to provide for a direct measurement of strain in a physical member. It is also to be appreciated that all strain gauges may be incorporated in transducer structures as to provide for measurements of pressure, acceleration, vibration, etc.

Figure 6:
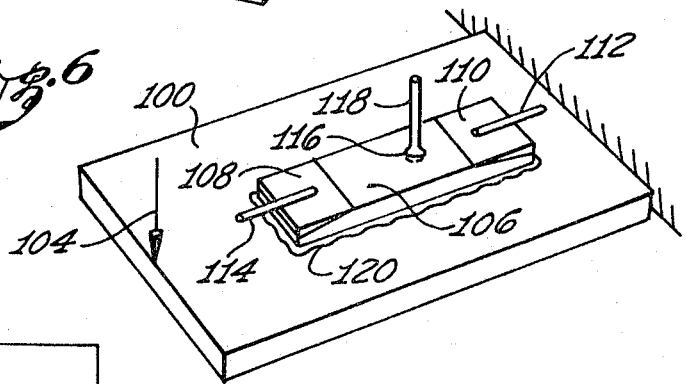
FIGURE 6 is an illustration of a unijunction transistor according to the present invention attached to a physical member.

FIGURE 6 illustrates a unijunction transistor constructed in accordance with the present invention to provide for a measurement of strain. In FIGURE 6 a physical member 100 is rigidly fixed at one end 102. A force 104 applies stress to the physical member 100. A unijunction transistor device according to the present invention includes a semi-conductor member 106. A pair of ohmic contact areas 108 and 110 are attached to opposite ends of the semi-conductor member 106 to provide the base terminals. A pair of lead members 112 and 114 may be attached to the ohmic contact areas 108 and 110. A PN emitter junction 116 is provided intermediate the ohmic contact areas 108 and 110. It is not important whether the semi-conductor material 106 is the P material or the N material since the emitter junction 116 is chosen to be of the opposite type of semi-conductor material.

A lead member 118 is attached to the emitter junction so as to provide for the emitter terminal. The PN emitter junction 116 may be constructed by any of the known methods of providing such PN junctions. The semi-conductor material 106 is bonded to the physical member 100 through the use of a bonding agent such as a cement 120 so as to provide for a transmission of the stress applied to the physical member 100 to the semi-conductor material 106. As can be seen in FIGURE 6 as the stress applied to the physical member 100 changes, the resistance between the emitter terminal 118 and the base terminals 112 and 114 vary in accordance with the stress. The variations in the internal resistance of the unijunction transistor resistance provide for a change in the voltage necessary to produce for a forward biasing of the diode portion of the unijunction transistor. The unijunction transistor may therefore be used as a switching device to indicate when the stress applied to the physical member 100 has reached a particular level.

Figure 7:
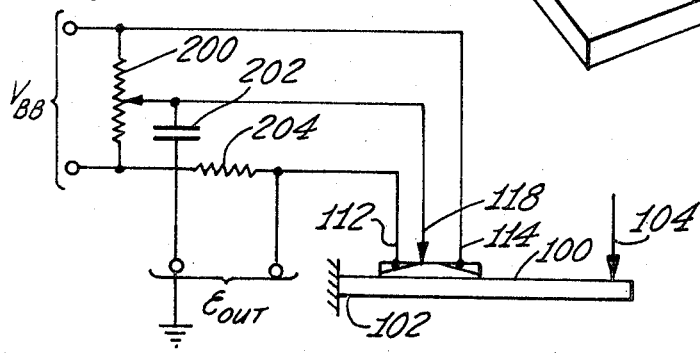
FIGURE 7 is an illustration of the unijunction transistor of FIGURE 6 connected in a relaxation oscillator circuit.

Another illustration of the use of the stress sensitive unijunction transistor of the present invention may be seen in FIGURE 7. In FIGURE 7 the unijunction transistor of FIGURE 6 is again bonded to the physical member 100. The physical member 100 is rigidly supported at the end 102 and the force 114 is applied to the physical member. The circuit of FIGURE 7 is similar to the circuit shown in FIGURE 4. In FIGURE 7 a voltage $V_{BB}$ is applied across a potentiometer 200. A capacitor 202 is connected between the arm of the potentiometer 200 and a reference potential such as ground. A load resistor 204 is connected between the base terminal 112 and the reference potential such as ground.

When the voltage $V_{BB}$ is connected in the circuit the capacitor 202 starts to charge and the voltage across the capacitor 202 is applied to the emitter terminal 118. When the voltage across the capacitor 202 reaches a particular level the emitter junction 116 in the unijunction transistor becomes forward biased and a forward emitter current flows through the emitter terminal to provide for a voltage across the load resistor 204. The actual value of the voltage necessary to provide for the forward biasing in the unijunction transistor depends on the internal resistance in the unijunction transistor. Referring back to FIGURE 2, the resistance in the unijunction transistor may be broken into two resistances or $R_{B1}$ and $R_{B2}$. As stress is applied to the unijunction transistor in the embodiment of FIGURE 7 resistances change in accordance with this stress. The change in resistance therefore provides for a change in the voltage $KV_{BB}$ described with reference to FIGURE 2.

The voltage $KV_{BB}$ is the value of the voltage necessary to forward bias the emitter junction portion of the unijunction transistor. Therefore, the stress applied to the physical member 100 which produces a corresponding stress to the unijunction transistor directly determines the value of the voltage at which the unijunction transistor switches. The value of the voltage in turn determines the frequency of the relaxation oscillator and the frequency of the output signal across the load resistor 204 is therefore in accordance with the resistance of the unijunction transistor which is in turn in accordance with the stress applied to the physical member 100. The frequency of the output signal is therefore in a direct relationship with applied stress.

It is not necessary to bond the entire bottom surface of the semi-conductor material, for example the semi-conductor material 106 is shown in FIGURE 6 to the physical member. For example, it may only be necessary to bond an area of the semiconductor material which corresponds to the internal resistance $R_{B1}$. Actually it would be desirable to provide an opposite change in resistance to the resistors $R_{B1}$ and $R_{B2}$ shown in FIGURE 2 with applied stress. An opposite change in resistance produces a greater swing of the voltage at the point between the resistors $R_{B1}$ and $R_{B2}$. The greater swing of the voltage increases the sensitivity of the unijunction transistor to applied stress. FIGURE 8 for example, illustrates one way in which the unijunction transistor may be attached to a physical member so as to provide for an opposite change in resistance.

In FIGURE 8 a diaphragm 250 is rigidly supported at both ends 252 and 254. The diaphragm member 250 may be, for example, a diaphragm member which is used in various types of transducers such as a pressure transducer wherein an appropriate force is directed towards the diaphragm so as to provide for a change in a bending of the diaphragm in accordance with the force. The bending of this diaphragm provides for a change in the strain within the diaphragm. One unusual characteristic of the strain in the diaphragm subjected to a uniform force such as pressure over the surface of the diaphragm is that the edges of the diaphragm exhibit a strain opposite to that of the center of the diaphragm. For example, if the center of the diaphragm is in tension the edges of the diaphragm are in compression. The point of transition from compression to tension is quite close to the edge of the diaphragm. A unijunction transistor 256 may therefore be attached near the edge of the diaphragm 250 as shown in FIGURE 8.

The unijunction transistor 256 is set so that a first portion of the unijunction transistor experiences compressive strain while the second portion of the unijunction transistor experiences tensile strain. The position of the unijunction transistor 256 may, therefore, be adjusted so that while the resistance of one portion of the unijunction transistor increases, the resistance of the other portion decreases. The opposite change in resistance provides for a greater change in the voltage at the point between the internal resistance so that the unijunction transistor switches over a greater range of applied stress.

FIGURE 9 illustrates a unijunction transistor constructed so as to provide for an increase in the internal resistance of one portion of the unijunction transistor while experiencing a decrease in the internal resistance of the second portion of the unijunction transistor. In FIGURE 9 a physical member 300 is rigidly attached at one end 302. A force is aplied to the physical member 300 at the point of 304. The unijunction transistor includes semi-conductive material 306 formed in a dog-leg shape. Ohmic contact areas 308 and 310 are provided at opposite ends of the semi-conductor material 306. A pair of lead members 312 and 314 are attached to the ohmic contact areas. An emitter junction 316 is attached to the semi-conductive material 306 in the same manner as that shown in FIGURE 6.

The semi-conductive material 306 is cemented to the surface of the physical member 300 through the use of cement 318. The use of the dog-leg shaped semi-conductor material 306 is similar to using a pair of strain gages at right angles to each other. The right angle arrangement of strain gages is known as the "Poisson" arrangement wherein the section of the strain gage between the emitter treminal 316 and the base terminal 314 is in tension while the section of the strain gage between the emitter terminal 316 and the base terminal 312 is in compression. The values of the strains in the different portions of the unijunction transistor of FIGURE 9 are in a particular ratio with each other. This ratio is called the "Poisson" ratio and may be determined experimentally. The use of a unijunction transistor structure as show in FIGURE 9 provides for a greater sensitivity to strain and will produce a switching characteristic over a broader range of strain than the unijunction transistor of FIGURE 6.

As can be seen by the above description, the present invention is directed to the use of a unijunction transistor device as a strain sensitive detecting element. The unijunction transistor provides for a switching characteristic which occurs when the voltage at the emitter terminal is above a particular level determined by the internal resistance of the unijunction transistor. The strain induced into the unijunction transistor provides for a change in this internal resistance so as to change the level of switching.

The unijunction transistor of the present invention may, therefore, be used as a switching element to produce an output signal in accordance with strain or may be used as a switching element which is incorporated in an oscillator such as a relaxation oscillator. When the unijunction transistor of the present invention is used in a relaxation oscillator the frequency of the output signal is in accordance with the strain since the strain directly affects the internal resistance and the internal resistance directly affects the discharge point of the relaxation oscillator.

Although the present invention has been described with reference to particular embodiments, it is apparent that other adaptations and modifications may be made. The invention, therefore, is only to be limited by the appended claims.

I claim:

1. A stress sensitive detector for detecting stress in a physical member including:
   a unijunction transistor having a pair of base terminals and an emitter terminal and having a portion of the unijunction transistor between both of the base terminals and the emitter terminal attached to the physical member to transmit stress in the physical member to the portion of the unijunction transistor to vary the resistance of the portion of the unijunction transistor in accordance with the stress and wherein the resistance between one of the base terminals and the emitter terminal increases as the resistance between the other of the base terminals and the emitter terminal decreases, and
   a source of voltage for applying a first voltage across the base terminals and for applying a second smaller voltage to the emitter terminal and with a forward emitter current flowing when the second voltage is greater than a particular value and with the particular value determined by the resistance of the portion of the unijunction member.

2. A stress sensitive detector for monitoring the stress in a physical member, including:
   a unijunction transistor including a member formed of a first type semi-conductor material and having a pair of spaced base terminals loacted on the semiconductor member and having a second type semi-conductor material forming an emitter junction on the semi-conductor member and with an emitter terminal connected to the emitter junction and with at least a portion of the semi-conductor member attached to the physical member to conduct stress from the physical member to the portion of the semi-conductor member to vary the resistance between both of the base terminals and the emitter terminal in accordance with the stress in the physical member and wherein the resistance between one of the base terminals and the emitter terminal increases as the resistance between the other of the base terminals and the emitter terminal decreases.

3. A stress sensitive detector having variations in accordance with the stress in a physical member, including:
   a unijunction transistor having a pair of base terminals at opposite ends of the unijunction transistor and an emitter terminal intermediate the base terminal and with a portion of the unijunction transistor between the emitter terminal and both of the base terminals attached to the physical member,
   a first voltage applied across the base terminals of the unijunction transistor,
   a second voltage smaller than the first voltage electrically coupled to the emitter terminal of the unijunction transistor and with a forward emitter current flowing when the second voltage is greater than a particular value and with the particular value determined by the resistance between the emitter terminal and both of the base terminals and with the resistance between the emitter terminal and both of the base terminals varying in accordance with the stress in the physical member and wherein the resistance between the emitter terminal and one of the base terminals increases as the resistance between the emitter terminal and the other of the base terminal decreases.

4. A stress sensitive frequency modulator for producing frequency variations in accordance with the stress in a physical member, including:
   a unijunction transistor having a pair of base terminals and an emitter terminal and having a portion of the unijunction transistor between both of the base terminals and the emitter terminal attached to the physical member to vary the resistance of the portion of the unijunction transistor in accordance with the stress and wherein the resistance between one of the base terminals and the emitter terminal increases as the resistance between the other of the base terminals and the emitter terminal decreases,
   a source of electrical energy, and
   a relaxation oscillator including capacitance means electrically coupled to the source of electrical energy and with the source of electrical energy charging the capacitance means and with the voltage across the capacitance means applied to the emitter terminal and with the capacitance means discharged through the unijunction transistor when the voltage applied to the emitter terminal reaches a particular voltage level and with the resistance of the portion of the unijunction transistor controlling the value of the particular voltage level.

5. A stress sensitive frequency modulator for monitoring the stress in a physical member, including:

a unijunction transistor including a member formed of a first type of semi-conductor material and having a pair of spaced base terminals located on the semi-conductor member and having a second type semi-conductor material forming an emitter junction on the semi-conductor member and with an emitter terminal connected to the emitter junction and with a portion of the semi-conductor member between the spaced base terminals attached to the physical member to conduct stress from the physical member to the portion of the semi-conductor member to vary the resistance between both of the base terminals and the emitter terminal in accordance with the stress and wherein the resistance between one of the base terminals and the emitter terminal increases as the resistance between the other of the base terminals and the emitter terminal decreases, and oscillator means electrically connected to the base and emitter terminals of the unijunction transistor and with the frequency of oscillation of the oscillator means in accordance with the resistance of the portion of the semi-conductor.

6. A stress sensitive frequency modulator having frequency variations in accordance with the stress in a physical member, including:

a unijunction transistor having a pair of base terminals at opposite ends of the unijunction transistor and an emitter terminal intermediate the base terminals and with at least a portion of the unijunction transistor between the emitter terminal and both of the base terminals attached to the physical member, a source of voltage applied across the base terminals of the unijunction transistor.

a capacitor electrically coupled to the source of voltage for charging the capacitor and with the voltage across the capacitor electrically coupled to the emitter terminal of the unijunction transistor and with the capacitor discharged through the unijunction transistor when the voltage across the capacitor reaches a particular value and with the particular value determined by the resistance between the emitter terminal and both of the base terminals and with the resistance between the emitter terminal and both of the base terminals varying in accordance with the stress in the physical member and wherein the resistance between the emitter terminal and one of the base terminals increases as the resistance between the emitter terminal and the other of the base terminals decreases.

References Cited

UNITED STATES PATENTS 3,183,705  5/1965  Welkowitz _____ 73—1
3,336,795  8/1967  Arakawa _____ 73—136

Sinclair: Negative Resistance Devices, Instrument Practice, November 1962, pp. 1373–1376.

CHARLES A. RUEHL, Primary Examiner.

U.S. Cl. X.R.

73—141.